(12) United States Patent
Marra et al.

(10) Patent No.: US 7,722,211 B2
(45) Date of Patent: May 25, 2010

(54) LIGHT ENGINE

(75) Inventors: Johan Marra, Eindhoven (NL); Hans Van Sprang, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 11/573,051

(22) PCT Filed: Aug. 2, 2005

(86) PCT No.: PCT/IB2005/052583

§ 371 (c)(1),
(2), (4) Date: Feb. 1, 2007

(87) PCT Pub. No.: WO2006/016324

PCT Pub. Date: Feb. 16, 2006

(65) Prior Publication Data

US 2008/0094835 A1    Apr. 24, 2008

(30) Foreign Application Priority Data

Aug. 6, 2004  (EP) ................................. 04103783

(51) Int. Cl.
*F21V 7/22* (2006.01)
(52) U.S. Cl. .................... 362/227; 362/230; 362/235; 362/800; 362/249.02
(58) Field of Classification Search ............... 362/800, 362/230, 227, 249.02
See application file for complete search history.

(56) References Cited

U.S. PATENT DOCUMENTS

| | | | |
|---|---|---|---|
| 4,387,385 A | 6/1983 | Thillays et al. | |
| 4,389,698 A | 6/1983 | Cibie | |
| 4,935,665 A | 6/1990 | Murata | |
| 5,321,586 A | 6/1994 | Hege et al. | |
| 5,890,794 A | 4/1999 | Abtahi et al. | |
| 6,402,347 B1 | 6/2002 | Maas et al. | |
| 6,422,718 B1 | 7/2002 | Anderson et al. | |
| 7,145,125 B2 * | 12/2006 | May et al. ............ | 250/228 |
| 7,479,622 B2 * | 1/2009 | May et al. ............ | 250/205 |
| 7,497,590 B2 * | 3/2009 | Rains et al. ........... | 362/231 |
| 7,521,667 B2 * | 4/2009 | Rains et al. ........... | 250/228 |
| 7,604,375 B2 * | 10/2009 | Rains et al. ........... | 362/231 |
| 7,625,098 B2 * | 12/2009 | Rains et al. ........... | 362/231 |
| 2002/0006040 A1 | 1/2002 | Kamada et al. | |

FOREIGN PATENT DOCUMENTS

| | | |
|---|---|---|
| DE | 10016714 A1 | 10/2001 |
| DE | 10142541 A1 | 3/2003 |
| EP | 1070909 A1 | 1/2001 |
| GB | 2374919 A | 10/2002 |
| GB | 2375814 | 11/2002 |
| JP | 11340378 A | 10/1999 |
| WO | 9736552 | 10/1997 |

OTHER PUBLICATIONS

ISR: PCT/IB2005/052583.
Written Opinion: PCT/IB2005/052583.

* cited by examiner

*Primary Examiner*—Anabel M Ton (57) ABSTRACT

The invention describes a Light engine (1,2,3,4,5) comprising a chamber (6) with at least one aperture (7) and a number of LED elements (13) positioned inside this chamber, where effectively all inner surfaces of the chamber (6) are realized as high-reflective surfaces (20) which are essentially non-absorbing towards light within a desired wavelength region

16 Claims, 9 Drawing Sheets

LIGHT ENGINE

This invention relates to a light engine comprising a chamber with at least one aperture and a number of LED elements positioned inside this chamber.

A general need exists for highly intense and highly luminous localised light sources for the purpose of, for example, coupling this light into one or into a plurality of optical fibres, thereby allowing the light to be transported away from a single light source to several remote locations, e.g. to a number of automotive headlights/taillights etc., or, for example, for emitting a concentrated very bright light beam directly into the outside world or into some embodiment of a light guide or into a collimating element for the purpose of shaping and/or collimating the emitted light beam according to certain desired specifications. An example is a light engine comprising an intense single light source, for example a HID lamp. With secondary optics, usually comprising at least a parabolic mirror and a collimating lens, the light from the light source is projected and focused onto an optical fibre array, which allows for light transport. Examples of the latter include a display backlight and an automotive headlight In recent years, because of some well-known advantages of LED light sources when compared with traditional light sources, interest in the use of LED light sources instead of traditional light sources has grown considerably.

During the past decade, the technology concerning the design and manufacture of LEDs, particularly solid-state inorganic LEDs, has rapidly improved up to the point where inorganic white-light emitting LEDs can now be manufactured at an efficiency of just over 40 lm/Watt. This clearly surpasses that of traditional white incandescent lamps (16 lm/Watt at best) and most halogen lamps (30-35 lm/Watt at best). The lumen output from a single LED die has now increased to well beyond 100 lm and it is expected that in a few years it should be possible to achieve an efficiency of 75 lumens/Watt at an input power of 2.7 Watt per LED die, thus producing 200 lumen/LED. On the other hand, the limited luminous output per LED die still presents a hurdle to be overcome on the way to a general application of LEDs for lightning purposes in the foreseeable future. General lighting sources must produce luminous fluxes within the range of 500-1000 lumens for domestic use, and 1000-3000 lumens for occupational use, i.e. the current output of ordinary incandescent and fluorescent lighting sources. This can only be accomplished with LEDs when the light output from up to a few dozen LED dies is combined within a single fixture, giving a so-called light engine. In itself this should not be a problem, however, it starts to be a problem when a high-brightness light source is required, because, for instance, the emitted light from all LEDs combined has to be collimated with the aid of a small-sized compact collimating element. A well-known example of the latter is an automotive headlamp. Here, one commonly makes use of H7 halogen lamps (55 W input power) which emit some 1500 lumens. These lumens are emitted at a brightness of about 30 Mcd/m$^2$. In case of using a Xenon HID lamp, the achieved brightness increases to about 80 Mcd/m$^2$. In contrast, when a single 1 mm$^2$ LED die is made to emit 50 lumens of white light, which is about the best that can be achieved with the technology currently available, the brightness of a single die is only 8 Mcd/m$^2$, still a few times below that of a halogen lamp and an order of magnitude below the brightness of a conventional HID lamp. The situation significantly worsens when multiple LED dies are required, due to the necessary spacing between adjacent dies.

One example of a LED light engine (also called 'light generator'), capable of combining the light output from various LED dies together to achieve a single concentrated (collimated) beam of emitted light, is disclosed in U.S. Pat. No. 6,402,347. Therein, individual LED elements are mounted on a back plate, each of them equipped with a collimating dome. An adjacent aligned Fresnel lens allows for the projection of the individual LED light beams onto a single output element, for example an optical light guide. A main problem of this system is the large light loss, which may amount up to about 60% due to reflections from the various optical interfaces. Other disadvantages of this light engine are its bulk, and the required precision alignment of the secondary optics, raising the cost for such a light engine. As yet, the size and cost of such a LED light engine far exceeds that of an ordinary high-intensity light source.

Therefore, an object of the present invention is to provide a LED-based light engine which is easier and cheaper to produce, which is of compact dimensions, and which shows a better performance than known LED-based light engines.

To this end, the present invention provides a light engine comprising a chamber with at least one aperture and a number of LED elements positioned inside this chamber, where, effectively, all inside surfaces of the chamber are realized as high-reflective, preferably diffuse-reflective (also called 'white-reflective'), surfaces which are essentially non-absorbing towards light within a desired wavelength region, particularly the visible region, the UV region, and/or the infrared region. The term 'high-reflective' is to be understood as a reflectivity approaching 100%, preferably ≧95%, more preferably ≧98%.

If, according to the invention, all inside surfaces which are not occupied by a LED element—including the surface area between the LED elements—are highly reflective, then essentially all light emitted by the LED elements will leave the chamber through the aperture, perhaps after multiple, possibly numerous, reflections. Such a phenomenon of multiple reflection of the light inside the chamber is known as 'internal light recycling'. In such a construction, every internal chamber surface is effectively an emissive surface, whether it emits light itself, as is the case with the surface of a LED element, or reflects light. The light engine according to the invention does not comprise the internal secondary optics from prior art light engines, and is therefore more economical to manufacture. If desirable, the light engine according to the invention can be provided with external secondary optics, preferably provided near the light engine aperture, for the purpose of shaping and/or collimating the emitted light beam from the light engine.

In a chamber designed in this way, constructed as a 'integrating sphere' or so-called 'Ulbricht sphere', by far the greatest part of the light emitted by the LEDs within the chamber will indeed exit the chamber through the aperture. Evidently, the efficiency of the entire light engine ultimately depends on the attained reflectivity of the inside surfaces of the chamber. Although the reflectivity of the inside surfaces is unlikely to reach exactly 100%, this limit can still be reasonably well approached. That an exceptionally good performance can be attained with a light engine according to the present invention is demonstrated in the following, whereby the values ultimately attained will always depend on the exact construction parameters of the light engine, such as the LED packing density within the chamber, the reflectivity of the LEDs, and the size of the aperture opening in relation to the total inner surface area of the light engine that is exposed to light. The exact construction parameters should therefore be chosen to suit the desired application.

In the following, it is assumed that the LEDs are solid-state inorganic LED dies, since these are currently available with sufficient luminous intensity. Nevertheless, any other electroluminescent elements can be used, for example, laser diodes, other types of semiconductor light emitting elements or organic LEDs, as long as these deliver sufficient performance. Therefore, the term 'LED' in the following is to be regarded as a synonym for any type of appropriate electro-luminescent element.

The dependent claims and the subsequent description disclose particularly advantageous embodiments and features of the invention.

The reflectivity of the inside surfaces can be achieved in basically any manner. It is only critical that the reflectivity be sufficiently high, preferably ≧98%. Preferably, the highly-reflective surfaces may be realized by distributing a diffuse reflective material over the inside surface of the chamber walls. For example, the inside surfaces can be coated with an appropriate material in the form of a particle/binder coating of sufficient thickness.

In a particularly preferred embodiment of the invention, the diffuse-reflective material is enclosed between the inside surface of the chamber walls, and a covering plate which is transparent in at least the desired wavelength region. The diffuse reflective material is thus 'sandwiched' between the inside surfaces of the chamber walls and the transparent covering plate. This construction permits use of a diffuse reflective material such as a reflective dry powder, preferably a free-flowing powder. Suitable reflective white powder may comprise inorganic particles such as $Al_2O_3$, $YBO_3$, $BaSO_4$, $TiO_2$, Ca-pyrophosphate, Ca-halophosphate, MgO, or mixtures of these particles. The absence of any organic binder material increases the reflectivity of the powder particles and avoids gradual discolouration over time. Use of Ca-pyrophosphate at an average particle diameter of 5-15 μm is particularly recommended because of its cheapness and ready availability, chemical purity, resistance to high temperatures (>1000° C.), its ability to behave as a free-flowing powder when mixed with approximately 1% w/w Alon-C nanoparticles (i.e. $Al_2O_3$ nanoparticles, Degussa GmbH, Germany) which is useful for enabling an easy filling of the relatively narrow space between the inside surfaces of the chamber and the covering plate with dry powder particles, and its proven non-absorbing characteristics towards visible light after annealing at 900° C. With Ca-pyrophosphate powder, the reflective powder layers should preferably have a thickness of at least 2 mm in order to accomplish a reflectivity of at least 98-99%.

In order to attain a greatest possible efficiency as regards converting the input power into light, it is necessary that as much as possible of the light generated inside the LED elements actually exits the LEDs into the chamber interior. This is not without problems, owing to the internal reflections arising at the boundary layer between the LED die surface and the surroundings. Therefore, in a preferred embodiment of the invention, the light engine comprises outcoupling means for enhancing outcoupling of the light emitted by the LED elements into the chamber.

The outcoupling means might comprise transparent domes, made, for example, from a silicone resin and/or some organic polymeric material, each of which is optically connected to a light emitting surface of an associated LED element. Preferably, the domes protrude through holes in a covering plate, when such a covering plate is used for covering the chamber wall on which the LED elements and/or LED device bodies are mounted, and for covering/sandwiching a diffuse-reflective white material. The presence of such transparent domes around the LED elements promotes light outcoupling from the LED dies. On the other hand, their presence may adversely affect the efficiency with which the internal light recycling inside the light engine chamber can be realised. Depending on the LED characteristics and the wavelengths involved, light absorption might take place at the bottom of the domes inside or directly adjacent to the associated LED elements. Furthermore, a highly-reflective coating on the inside of the light engine is present only on the inside wall surface areas located in between the domes, the domes having a significantly larger cross-section than the cross-section of the associated LED dies themselves.

Therefore, in an alternative embodiment, the LED domes are simply omitted. The white-reflective coatings can then be applied in between the LED die elements and will cover a substantially larger fraction of the inside wall surface area when compared with the situation in which domes are used. As light outcoupling from bare LED dies is intrinsically less efficient, the exposed LED die surfaces are preferably covered with a transparent scattering coating layer that is in optical contact with the die, or a microstructure is applied directly to the LED die surfaces. These latter measures promote light outcoupling from the LED dies.

In a most preferred embodiment, the transparent covering plate which covers the reflective material also covers the LED elements, and the outcoupling means comprises a number of transparent outcoupling elements, each of which extends from a light emitting surface of an associated LED element to the transparent covering plate. Thereby, the optical transparent outcoupling elements may itself form part of the covering plate.

The transparent outcoupling elements preferably have a cross section which is wider at an interface between the outcoupling element and the transparent covering plate than at an interface between the outcoupling element and the associated LED element. For example, the transparent outcoupling elements may have a conical, parabolic, or pyramidal form featuring a cross-section that widens in the direction facing away from the associated LED elements. Such a form ensures that the transparent outcoupling element not only helps to out-couple the light generated in the LED die and to conduct it, like a light conductor, through the transparent covering plate into the inside of the chamber, but also helps to act as a collimator for the LED, limiting the emission angle of the LED.

Essentially, any LED element can be used, for example LED dies that are coated with a light converting substance (usually called fluorescent or just 'phosphor' coating). The phosphor coating of such LEDs ensures that at least a part of the light emitted by the LED at a certain wavelength is converted into a different wavelength, so that, overall, light is emitted with a desired wavelength characteristic, i.e. a certain colour. An optical interference layer may be arranged between the LED die and the phosphor coating on the LED die surface serving to promote the transmission of the light generated inside the LED die into the phosphor layer and to diminish the transmission of phosphor-converted light from the phosphor layer into the LED die.

In case phosphor conversion LEDs are used, the light converting substance—such as phosphor particles—can be distributed either on or in the reflective material, for example the white reflective powder, which is distributed either as a particle/binder coating over the inside surfaces of the chamber walls or which is sandwiched as a binder-free dry powder layer between the inside surfaces of the chamber walls and a transparent covering plate. This is not only easier and cheaper from a processing/packing point of view, but also offers a strategy which counteracts phosphor saturation phenomena and should help to raise the lumen output from the dies.

Incorporating the phosphors in the diffuse reflective white powder through e.g. a simple mixing of the dry powders, simplifies the manufacture of the LED elements and avoids phosphor saturation at high light intensities since a larger amount of phosphor can then be spread across a relatively large surface area. The amount and positioning of the phosphors in the diffuse-reflective white powder layer or the diffuse-reflective particle/binder coating can be optimized such that a suitable colour point is obtained. In this case, phosphor-free LED elements can also be used.

Additionally or alternatively, LED elements of differing wavelength characteristics, e.g. red, green, blue can be used, positioned as desired within the light engine. The issue of adequate colour mixing is automatically solved when a light engine according to the invention is utilised, since the individual LED dies cannot directly be observed from the outside and internal colour mixing is taken care of by the internal light recycling process.

The aperture can consist basically of a simple opening in the chamber wall. The effect of the aperture parameters on the performance of the light engine will be discussed in detail later. A light conductor element can be arranged near, in, or on the aperture, for example an optical fibre or similar, in which the light, generated in the light engine, is caught. In a preferred embodiment of the invention, a beam-forming element is arranged in or near the aperture. A light collimating element, e.g. in the form of a lens, a conical element, a pyramidal element, or a parabolic element, is particularly preferred. The light exiting through the aperture is collimated within a defined emission angle and/or is shaped within a defined spatial/angular light intensity distribution pattern by such a collimating element.

To minimise light losses through internal reflections at the various optical interfaces existing within the light engine, for instance the interfaces between the chamber interior and the transparent covering plate and/or between the chamber interior and the outcoupling means and/or between the chamber interior and the collimating element disposed at the light engine aperture, and/or between the chamber interior and the LED die surfaces, the chamber is preferably filled with a material which has a refractive index that approaches or, more preferably, matches the refractive index of the transparent covering plate and/or of the outcoupling means and/or of the collimating element and/or of the LED elements, and which therefore reduces or even eliminates the 'optically visibility' of the various optical interfaces with respect to visible light and/or with respect to the light generated inside and emitted from the LED dies.

This material may be an organic medium such as a transparent liquid, particularly an oil, or a solid resin, particularly a silicone resin, possessing the desired (matching) refractive index, and which is preferably substantially non-absorbing with respect to visible light and/or with respect to the light generated inside and emitted from the LED dies. This measure also minimises Fresnel reflections from the optical element positioned at the aperture of the light engine when the filling material inside the cavity is in optical contact with the said optical element. A preferred embodiment is obtained when the material is a liquid material that is also used for the front-end cooling of the LED elements. Preferably, the liquid material is then pumped around as a fluid between the light engine cavity and some additional external cooling device in order to increase the cooling effect of the fluid.

The light engine according to the invention can be used for any LED luminaire application, characterised in that the luminaire possesses a light output aperture of restricted-area, with a light output beam of adjustable brightness and colour, from where the light can be transported to several remote locations, particularly in automotive light systems such as automotive headlamps. The brightness of the emitted light output beam can be conveniently adjusted by altering the electrical power delivered to individual LED elements inside the light engine. The colour of the emitted light output beam can also be adjusted by altering the electrical power delivered to individual LED elements under the circumstance that LED elements of differing wavelength characteristics are present inside the light engine, e.g. red, green, and blue LED elements.

Other objects and features of the present invention will become apparent from the following detailed descriptions considered in conjunction with the accompanying drawings. It is to be understood, however, that the drawings are designed solely for the purposes of illustration and not as a definition of the limits of the invention. In the drawings, wherein like reference characters denote the same elements throughout.

The dimensions of the objects in the figures have been chosen for the sake of clarity and do not necessarily reflect the actual relative dimensions.

Figure 1:
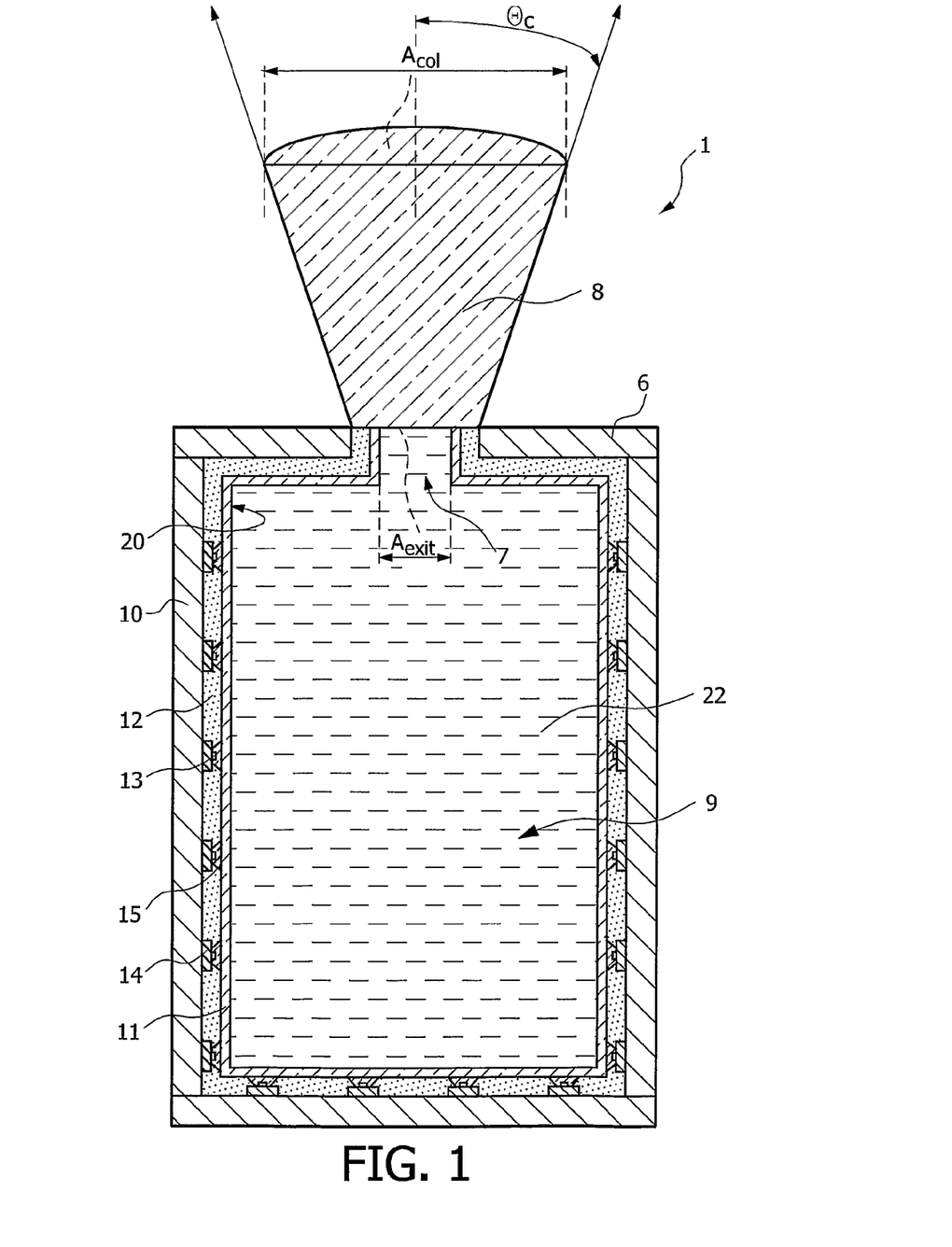
FIG. 1 shows a first embodiment of a light engine according to the invention.
Figure 2:
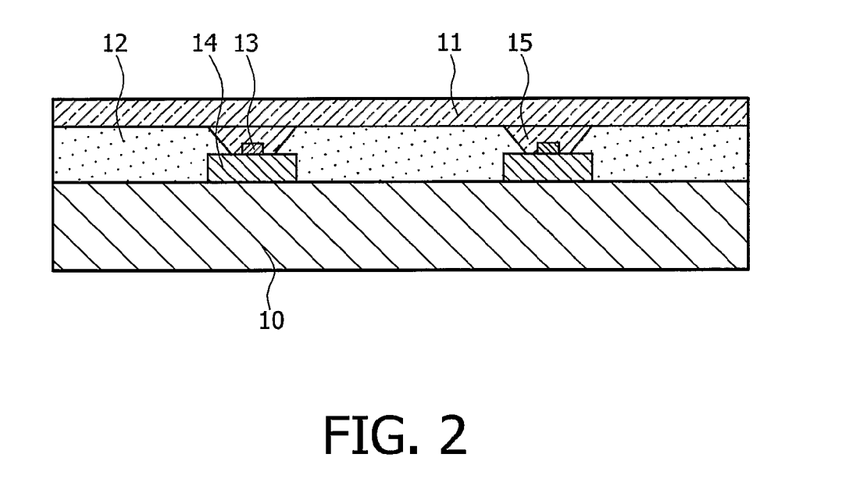
FIG. 2 shows an enlarged image of a part of the walls of the chamber of the light engine according to FIG. 1.

FIGS. 1 and 2 show a particularly preferred embodiment of a light engine according to the present invention, whereby FIG. 1 shows a cross-section through the entire light engine, and FIG. 2 shows an enlarged cross-section through the chamber wall.

The light engine 1 comprises a chamber 6, constructed, for example, in a rectangular or cylindrical manner. An opening or aperture 7 of surface area $A_{exit}$ is located at the top of the chamber 6 and connects to a collimating element 8. LED elements 13 are positioned on the inside wall 10 of the chamber 6 at a certain distance from each other, i.e. in a particular grid, along the mantle and on the inside surface opposite the aperture 7. These LED elements 13 are connected via outcoupling elements 15 to a transparent covering plate 11.

This transparent covering plate 11 is positioned in the chamber 6 at a certain distance to the inside wall of the chamber 6. All walls 10 of the chamber 6, including the top side with the aperture 7, are covered by the transparent covering plate 11. The gap between the transparent covering plate 11 and the inside surfaces of the walls 10 of the chamber 6 is filled with a diffuse reflective white powder. Suitable candidates for the reflective white powder are $Al_2O_3$, $TiO_2$, $YBO_3$, $BaSO_4$, Ca-pyrophosphate, Ca-halophosphate, or MgO. Suitable materials for the transparent covering plate 11 include PMMA (polymethyl-methacrylate), PC (polycarbonate), resinous silicone compounds, and glass. This construction ensures that all inside surfaces 20 of the chamber 6, not occupied by a LED die, are highly reflective.

The construction of the walls can be seen in detail in FIG. 2. Here, the individual LED dies 13 are mounted on mounting slugs 14 which, preferably, also feature a reflective top surface around the LED dies. Transparent truncated inverted pyramids or cones serve as outcoupling elements 15 that are optically coupled to the transparent covering plate 11. Furthermore, these outcoupling elements 15 are optically coupled to the LED dies 13 by means of a resin or some other suitable glue-like material. Instead of optically coupling these outcoupling elements 15 with resin or a similar material to the transparent covering plate 11, they can preferably also be directly formed as part of the transparent covering plate 11. The outcoupling elements 15 guide the emitted light towards the interior 9 of the light engine 1. The cross-section of the conical outcoupling elements 15 widens in the direction facing away from the associated LED dies 13. Preferably, the outcoupling elements feature an angle of inclination between 5° and 65° with respect to the vertical, more preferably featuring an angle of inclination between 20° and 50° with respect to the vertical, and most preferably featuring an angle of inclination of about 45° with respect to the vertical.

The distance between the transparent covering plate 11 and the inside surface of the non-transparent outer wall 10 of the chamber 6, i.e. the thickness of the diffuse reflective powder layer 12, is preferably about 2-3 mm. The powder layer 12 provides the highly reflective surfaces 20 of the chamber 6, which enable internal light recycling. A collimating element 8 is arranged on the aperture 7, and is made from, for instance, transparent plastic material, and receives light that is emitted from the aperture 7 of the light engine 1. The shape of the collimating element 8 is chosen such that substantially no light is emitted from the exit surface of the collimating element 8 at an angle greater than the collimation half angle $\theta_C$ measured with respect to the propagation direction of the emitted light beam.

In order to improve the light outcoupling from the transparent covering plate 11 into the inside of the chamber 6, and to simplify the coupling of the light from the chamber 6 into the collimating element 8, the interior 9 of the entire chamber 6 is filled with a solid or liquid medium 22 which has a refractive index approaching or, more preferably, matching that of the transparent covering plate 11 and possibly also that of the collimating element 8. Unwanted light-loss inducing reflections at the boundary interfaces between the covering plate 11 and the medium 22, and at the interface between the collimating element 8 and the medium 22 are thereby avoided or at least diminished. In case the medium 22 is a liquid medium, the liquid can also be utilised for front-end LED cooling purposes, for instance by pumping the liquid medium 22 between the chamber 9 and an external cooling device.

Figure 3:
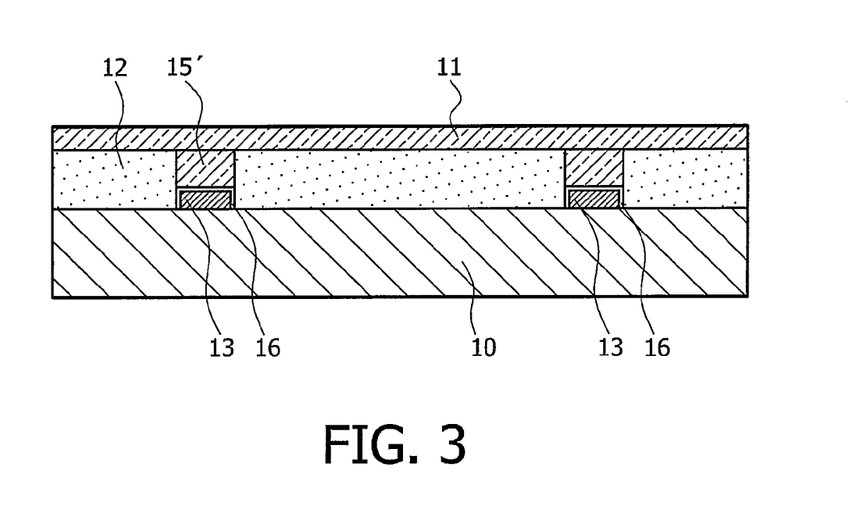
FIG. 3 shows an enlarged portion of a wall of a chamber of a light engine according to a second embodiment of the invention.

FIG. 3 shows a somewhat modified construction of the inside surface of the wall 10 of the chamber 6. Here, the LED dies 13 are mounted directly on the inside surface of the chamber wall 10. An optical contact layer 16 is positioned on each LED die 13. This contact layer 16 may contain scattering particles to promote light outcoupling from the LED die 13. The transparent covering plate 11 features block-shaped outcoupling elements 15', which protrude from the transparent covering plate 11 towards the LED die 13, acting as an extension or bridge, and providing optical contact with the contact layer 16. The space between the transparent covering plate 11 and the inside surface of the wall 10 is here also filled with a reflective dry white powder 12.

Figure 4:
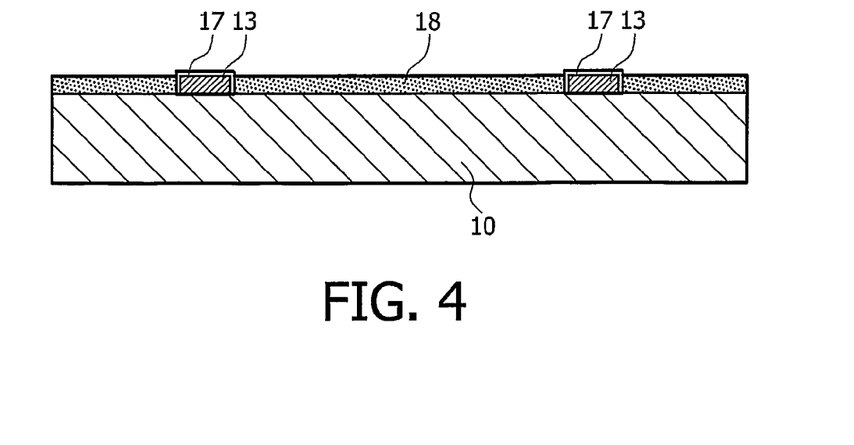
FIG. 4 shows an enlarged portion of a wall of a chamber of a light engine according to a third embodiment of the invention.

FIG. 4 shows a further possible construction. As in FIG. 3, the LED dies 13 are positioned on the inside wall 10. To facilitate outcoupling of the light emitted by the LED die 13 through the LED die surface, the LED dies 13 are preferably surrounded by a transparent scattering layer 17 that is in optical contact with the LED die surface, thereby promoting light outcoupling from the LED dies 13 into the chamber 6. A highly diffuse-reflective white particle/binder layer 18 covers the surfaces of the inside wall 10 that are located between the individual LEDs 13.

Figure 5:
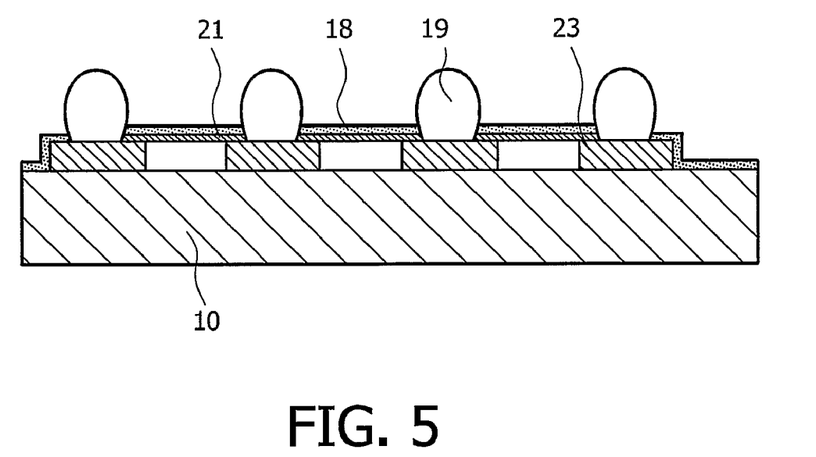
FIG. 5 shows an enlarged portion of a wall of a chamber of a light engine according to a fourth embodiment of the invention.

In FIG. 5, a further possible construction can be seen, where LED device bodies 23, each with a LED die element (not shown in the diagram), are mounted on the inside surface of the outer wall 10. The LED die elements themselves are enclosed in LED domes 19, which ensure good outcoupling of the light emitted from the LED dies. A covering plate 21, with suitable openings in a grid pattern through which the LED domes 19 protrude, covers the LED device bodies 23. The surface of the covering plate 21 between the LED domes 19 is covered with a white diffuse-reflective particle/binder coating 18 possessing a sufficient thickness to yield a highly reflective coating layer 18.

Figure 6:
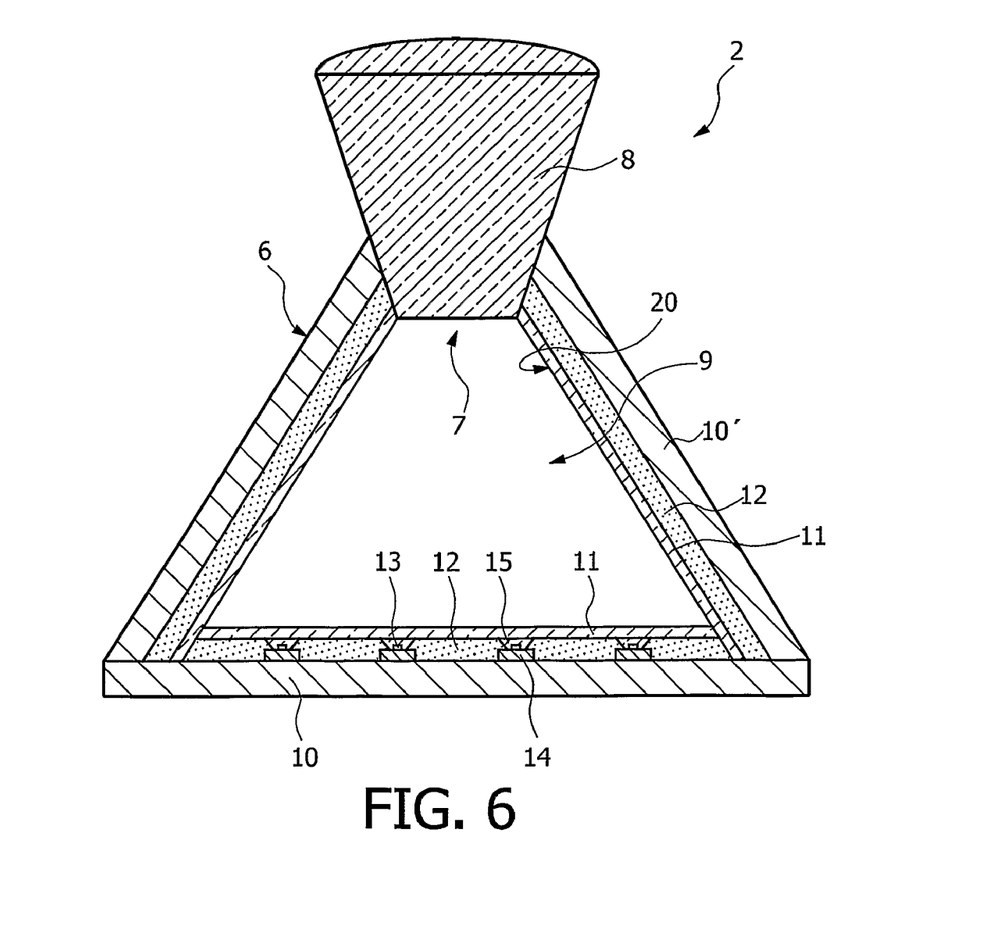
FIG. 6 shows a fifth embodiment of a light engine according to the invention.

A further example construction of a light engine 2 is shown in FIG. 6. The basic difference between it and the example shown in FIG. 1 is that the chamber 6 is constructed differently than that of the light engine 1 in FIG. 1. Here, the chamber 6 features a floor wall 10, upon which the individual LEDs are mounted as in the example shown in FIG. 1. However, the side walls 10' now extend conically from the floor wall 10 towards the aperture 7. No LEDs are positioned on these side walls 10'. To give the desired highly reflective inside surface 20, a transparent covering plate 11 is, as for the floor wall 10, arranged at a distance of about 2-3 mm from the inside of the side walls 10', and the space between the covering plate 11 and the side walls 10', as well as the space between the floor wall 10 and the covering plate 11 in between the LED mounting elements 14, dies 13, and outcoupling elements 15 are filled with a highly reflective white powder 12. Again, a collimating element 8 is arranged at the aperture 7. The advantage of this light engine 2 over the light engine 1 lies in its reduced volume and, in particular, in its reduced height. On the other hand, the number of LED elements relative to the total area of the chamber's inside walls is lower, since the side walls 10' are not occupied by LED elements.

Figure 7:
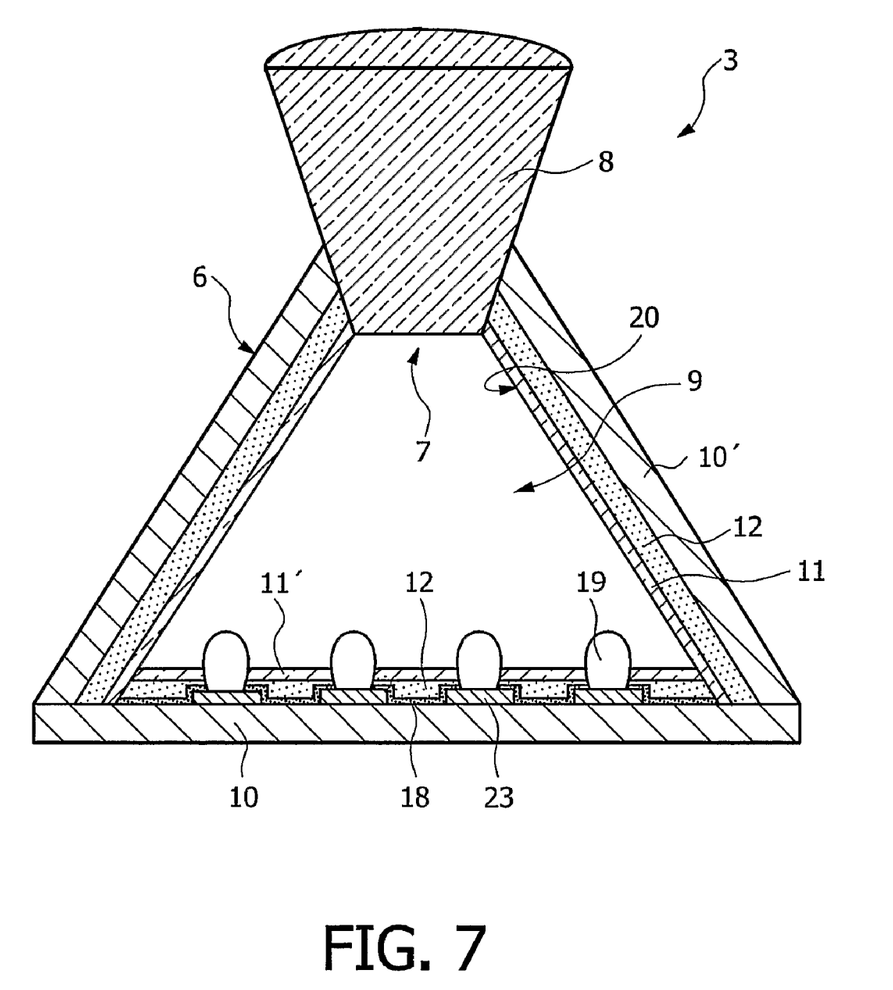
FIG. 7 shows a sixth embodiment of a light engine according to the invention.

A further embodiment of a light engine 3 according to the present invention is shown in FIG. 7. The housing 6 of this light engine 3 features the same geometry as the housing of the light engine 2. However, the LED elements are mounted on the base 10 in the same manner shown in FIG. 5, i.e. LED device bodies 23, supporting LED domes 19 in which the LED dies (not shown in the diagram) are enclosed, occupy the base 10. Both the surface of the base wall 10 upon which the LEDs are mounted as well as the side walls and the tops of the LED device bodies 23 are covered with a white diffuse reflective coating 18 leaving only the protruding domes 19 to remain uncoated. A transparent covering plate 11', with suitable openings in a grid pattern through which the LED domes 19 protrude, covers the LED device bodies 23. The space between this transparent covering plate 11' and the inside surface of the outer wall 10 is filled with a reflective white dry powder 12. The conical side wall 10' narrowing to the aperture 7 with the reflective material 12 disposed between the inside surface of the side wall 10' and a transparent covering plate 11 is constructed in the same manner as for the light engine 2 of FIG. 6.

Figure 8:
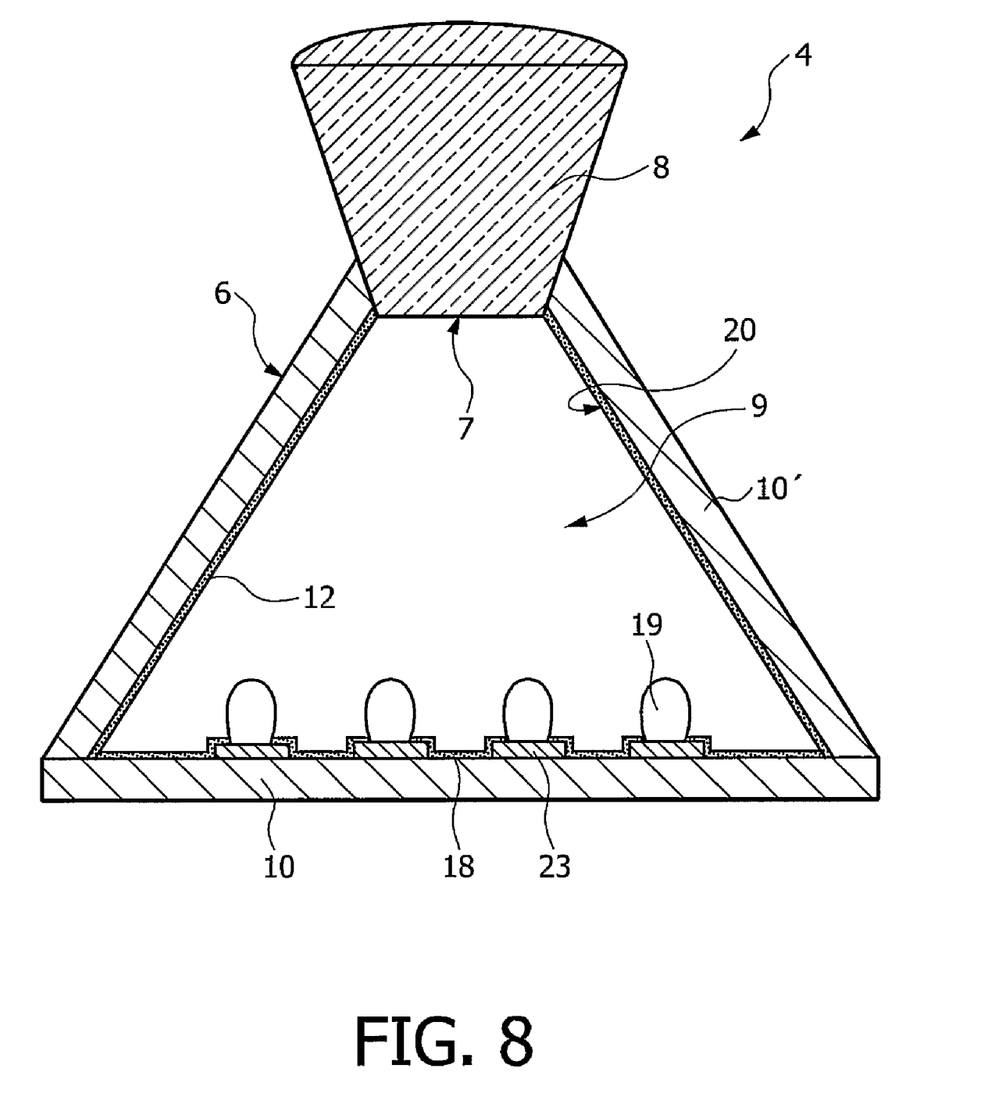
FIG. 8 shows a seventh embodiment of a light engine according to the invention.

FIG. 8 shows a further embodiment of a light engine 4 according to the present invention, which, as regards outer housing 6, is constructed in a similar manner as the example described in FIG. 7. Other than in the example of FIG. 7, however, neither a transparent covering plate 11' nor a reflective white dry powder 12 are used here. Instead, the conical chamber walls 10' are now also covered on the inside with a white diffuse-reflective particle/binder layer 18 to give a highly reflective surface 20. In addition, a white diffuse-reflective particle/binder layer 18 is present on the inside surfaces of the chamber wall 10, and on the surfaces of the LED device bodies 23 located between the transparent domes 19.

Figure 9:
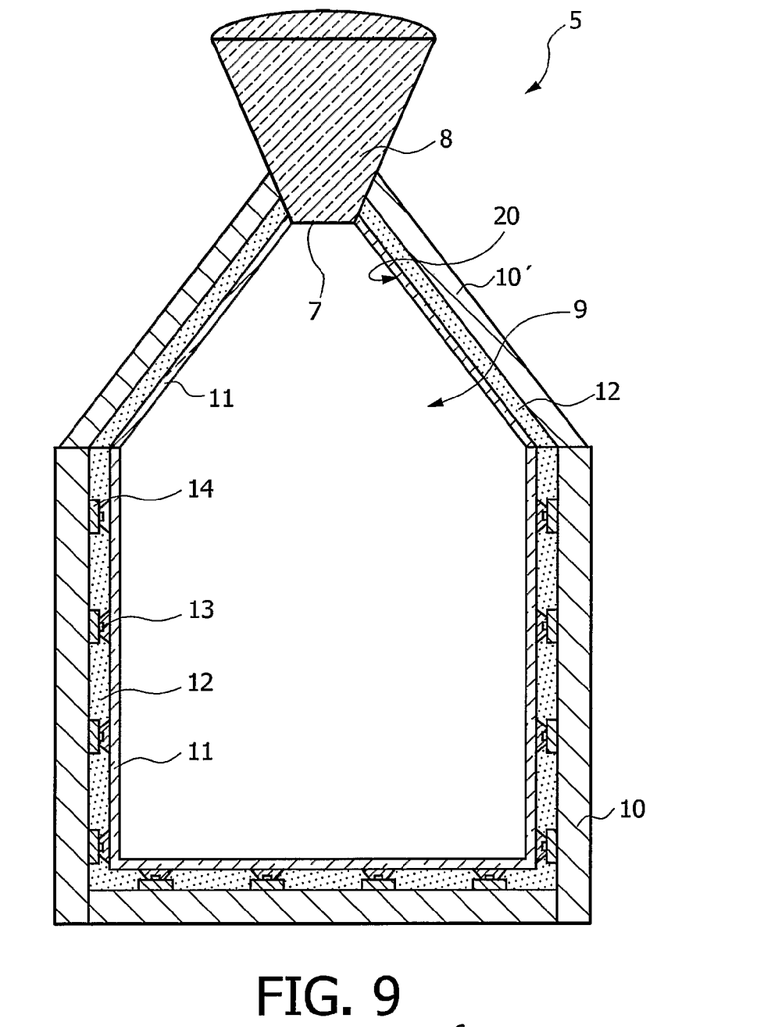
FIG. 9 shows an eight embodiment of a light engine according to the invention.

FIG. 9 shows a further embodiment of a light engine 5 according to the present invention, which essentially only differs from the examples in FIG. 1 and FIG. 6 in the outer shape of the chamber 6. The lower part of the chamber 6 is cylindrically or rectangularly shaped, with a base wall 10 and a side wall 10, each occupied by LED elements 13 arranged in a certain grid pattern. The upper part of the chamber 6 narrows conically to the aperture 7, in the same way as the conically formed side wall 10' of the light engine 2 in FIG. 6. This conical wall 10' of the upper part of the chamber 6 is not occupied on the inside by LED elements 13, having only a highly reflective surface 20. This highly reflective surface 20 is formed again by a transparent covering plate 11 arranged at a distance from the walls 10, 10' and a white reflective powder 12 filling the space between the inside surface of the walls 10, 10' and the covering plate 11.

In all cases shown in the FIGS. 6 to 9, the interior 9 of the chamber 6 is preferably filled with a solid or liquid medium 22 possessing a suitable refractive index, as described in connection with the light engine 1 of FIG. 1.

Figure 10:
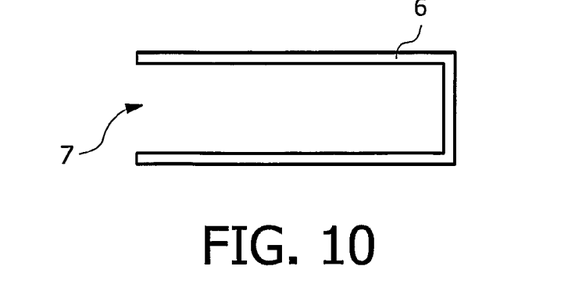
FIG. 10 shows a simplified schematic representation of the shape of a chamber for a light engine according to a ninth embodiment of the invention.

The different examples show that the chamber 6 can basically have any kind of external geometry. Furthermore, it must be stressed that the aperture 7 does not necessarily have to be a circular opening in a side wall and that it is not necessarily provided with an optical element 8. Any side wall, preferably of relatively small dimensions, can be simply left out of the construction, giving an aperture 7. This is shown by the cylindrical chamber 6 of the simplified schematic in FIG. 10. Basically, such a chamber 6 can have any basic surface geometry, for example an aperture on opposite sides. For example, one can also imagine elongated light engine cubes with both small faces open to the outside world. This depends on the intended function of the light engine, and the spatial constraints under which the light engine will operate.

The exact construction parameters such as chamber geometry, number of LED elements in the chamber, size of aperture etc., depend on constraints such as the maximum size of the light engine, and the desired output parameters. The following therefore describes how the attainable output parameters depend on the construction parameters of the light engine:

Consider the light engine box depicted in FIG. 1 possessing a single aperture or exit port 7 of surface area $A_{exit}$, and a total interior surface area $A_{engine}$, which includes the exit port surface area $A_{exit}$. Suppose that a total number $N_{LED}$ of individual LED die elements 13, each possessing a projected) flat top area $A_{LED}$, are mounted on the inner surface of the wall 10 of the light engine 1. Each LED element 13 is assumed to possess a reflectivity $R_{LED}$ and emit a lumen flux $\phi_{LED}$ from its die area $A_{LED}$. A white diffuse-reflective wall 20 of reflectivity $R_{wall}$ is laterally present around the LED elements 13.

The transmitted fraction T of the internally produced light that escapes via the aperture exit port 7 into the outside world follows from the series:

$$T = \frac{A_{exit}}{A_{engine}} + \left(1 - \frac{A_{exit}}{A_{engine}}\right) R_{av} \frac{A_{exit}}{A_{engine}} + \left(1 - \frac{A_{exit}}{A_{engine}}\right)^2 R_{av}^2 \frac{A_{exit}}{A_{engine}} + \ldots$$

which, with the 'aperture fraction'

$$f = \frac{A_{exit}}{A_{engine}}$$

is equivalent to $$T = \frac{f}{1 - R_{av}(1 - f)} \quad (1)$$

Thereby, $R_{av}$ denotes the averaged internal reflectivity $R_{av}$ of the non-exit part of the light engine's inner wall surface according to $$R_{av} = \frac{N_{LED} A_{LED} R_{LED} + (A_{engine} - A_{exit} - N_{LED} A_{LED}) R_{wall}}{A_{engine} - A_{exit}} \quad (2)$$

$$= \theta_{LED} R_{LED} + (1 - \theta_{LED}) R_{wall}$$

wherein $$\theta_{LED} = \frac{N_{LED} A_{LED}}{A_{engine} - A_{exit}} \quad (3)$$

denotes the fraction of the internally reflecting light engine surface area $A_{engine} - A_{exit}$ that is covered with LED elements 13.

The above equations do not assume any specific shape of the internal light engine wall. On the other hand, the series expansion in Equation (1) only holds for small aperture fractions f. In the extreme case of a light engine comprising a single flat light-emitting surface, one has a maximum f=0.5 and, by definition, T=1 since no reflecting surfaces are in the way of the emitting light sources. In this case, Equation (1) erroneously predicts a T<1 but the error is still not substantial as long as $R_{av}$>0.90, which can readily be accomplished.

For realistic light engines, an upper limit f≈0.3-0.4 should preferably be maintained, but the concept of a light engine according to the invention is obviously more interesting for much smaller values of f. For example a light engine embodied as a square cube that is open on only one of its six sides possesses an aperture fraction f=0.17. Smaller values for the aperture fraction f can be easily obtained by making the cube more rectangular while keeping only one of its two small sides open. In a preferred embodiment of the invention, the aperture fraction f should be ≦0.15, more preferably ≦0.1. For example, a light engine 1 according to FIG. 1 with a diameter of 2 cm, a chamber length of 3 cm and an aperture diameter of 1 cm has an aperture fraction f=0.03.

In case $R_{LED}=R_{wall}=R_{av}=1$, no light losses are present and one obtains T=1 according to Equation (1) for any arbitrarily small aperture fraction f. This would theoretically allow the creation of extremely high brightness levels when f→0. In reality, however, this is impossible since optical light losses can never be fully avoided.

It is therefore also of interest to derive an equation for the obtainable brightness at the aperture exit port 7 of the light engine 1 as a function of the system parameters. The brightness ratio B, denoting the brightness $B_{exit}$ at the aperture exit port 7 (assuming that no collimating element 8 is present) normalised with respect to the brightness level $B_{LED}$ of an individual LED die element 13, follows from $$B = \frac{B_{exit}}{B_{LED}} = \frac{\frac{TN_{LED}\varphi_{LED}}{A_{exit}}}{\frac{\varphi_{LED}}{A_{LED}}} \quad (3)$$

$$= \frac{TN_{LED}A_{LED}}{A_{exit}} = T\frac{N_{LED}A_{LED}}{A_{engine}-A_{exit}}\frac{A_{engine}-A_{exit}}{A_{exit}}$$

$$= T\theta_{LED}\left(\frac{1}{f}-1\right) = \frac{f}{1-R_{av}(1-f)}\theta_{LED}\frac{1-f}{f}$$

$$= \frac{1-f}{1-R_{av}(1-f)}\theta_{LED}$$

$$= \frac{(1-f)\theta_{LED}}{1-(1-f)[\theta_{LED}R_{LED}+(1-\theta_{LED})R_{wall}]}$$

which is valid when both the LED dies 13 and the aperture exit port 7 emit non-collimated light (i.e. Lambertian light with $\theta_c=90°$).

In addition, it is instructive to derive a relation for a second brightness ratio $L(\theta_c)$, also called 'brightness concentration factor' in the following, with $$L(\theta_c) = \frac{B_{exit}(\theta_c)}{B_{screen}(\theta_c)} \quad (4)$$

which denotes the ratio of the brightness $B_{exit}(\theta_c)$ of the light-emitting exit surface (which may be the projected light-emitting exit surface $A_{col}$ of the collimating element 8) to the screen-averaged brightness $B_{screen}(\theta_c)$ of an imaginary flat screen of surface area $A_{screen}=A_{engine}-A_{exit}$ whereupon LED elements 13 are mounted at a packing density $\theta_{LED}$. Here, light is assumed to be emitted as a collimated beam that is angularly bounded within a collimation half-angle $\theta_c$ with respect to the propagation direction of the beam. For non-collimated light, one has $\theta_c=90°$.

Knowledge of the brightness concentration factor $L(\theta_c)$ indicates whether or not a net light concentration has been achieved by packing $N_{LED}$ dies together inside a light engine 1 at a surface packing density $\theta_{LED}$ in comparison with the simpler situation wherein the $N_{LED}$ dies are simply mounted on a flat light emitting screen at the same surface packing density. A value $L(\theta_c)$>1 indicates a relative light (brightness) concentration and a value $L(\theta_c)$<1 indicates a relative light (brightness) dilution. Evidently, a value of $L(\theta_c)$ as large as is practically possible, and certainly higher than 1, is generally desirable.

In case the light engine 1 is made to emit 2D-collimated light, as shown in FIG. 1, the relevant exit port surface area becomes that of the projected output surface $A_{col}$ of the collimating element 8 mounted on the exit port 7 of the light engine 1. Following the etendue law, for a given collimation half-angle $\theta_c$, the minimum required output surface area $A_{col}$ of the collimating element 8 relates to the output area $A_{exit}$ of the aperture 7 of the light engine 1 in FIG. 1 according to $$A_{col} = \frac{A_{exit}}{\sin^2\theta_c} \quad (5)$$

and thus indicates an inevitable enlargement of the emitting surface $A_{col}$ at decreasing $\theta_c$.

The screen-averaged brightness level $B_{screen}(\theta_c)$ relates to $B_{LED}(\theta_c)$ according to $$B_{screen}(\theta_c)=\theta_{LED}B_{LED}(\theta_c) \quad (6)$$

In the embodiment of the light engine 1 according to FIG. 1, the individual LED elements are provided with a collimating element in the form of pyramidal outcoupling elements 15. Therefore, the apparent light emitting surface area of an individual LED also increases but these can be directly accommodated on the mounting screen (the imaginary flat screen of surface area $A_{screen}$ defined above for derivation of equation (4)) without enlarging the screen as long as the LED packing density constraint $$\theta_{LED}\leq\sin^2(\theta_c) \quad (7)$$

on the flat mounting screen is satisfied. The screen surface area $A_{screen}$ can then be taken to be independent of $\theta_c$.

From the above, and bearing in mind that $B_{exit}$ in Equation (4) denotes the brightness $B_{col}$ at the light output surface of the collimating element 8 mounted on the aperture opening 7 of the light engine 1 as soon as $\theta_c<90°$, it follows that $L(\theta_c)$ can be obtained from:

$$L(\theta_c) = \frac{B_{col}}{B_{screen}} = \frac{\frac{TN_{LED}\varphi_{LED}}{A_{col}}}{\theta_{LED}B_{LED}} \quad (8)$$

$$= \frac{\sin^2\theta_c}{\theta_{LED}}\left(\frac{\frac{TN_{LED}\varphi_{LED}}{A_{exit}}}{\frac{\varphi_{LED}}{A_{LED}}}\right)$$

$$= \frac{\sin^2\theta_c}{\theta_{LED}}B = \frac{(1-f)\sin^2(\theta_c)}{1-(1-f)[\theta_{LED}R_{LED}+(1-\theta_{LED})R_{wall}]}$$

Figure 11:
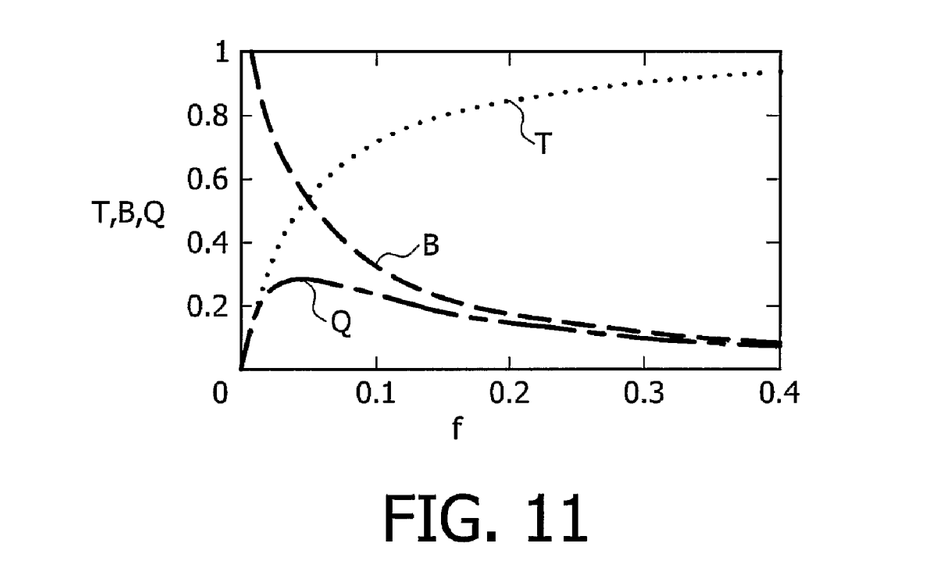
FIG. 11 is a diagram illustrating the influence of the aperture fraction f on:
   the fraction T of the internally generated light that is emitted (transmitted) from the light engine;
   the brightness ratio B denoting the brightness of the emitted light beam from the aperture of the light engine normalised with respect to the brightness of an individual LED element;
   a quality parameter Q.

For the special case $\theta_c=90°$ (Lambertian light) FIG. 11 shows calculated values for the transmission T and the brightness ratio B as a function of the aperture fraction f at a packing density $\theta_{LED}$=0.05 and at reflectivities $R_{wall}$=0.98 and $R_{LED}$=0.50 which corresponds to realistic conditions.

It is clear from FIG. 11 that, at decreasing aperture fraction f, the attainable brightness ratio B at the exit port increases, albeit at a significantly decreasing lumen output, which is proportional to the transmitted fraction T of the internally produced light that leaves the light engine. Because lumen flux and brightness exhibit opposite trends in their relationship with the aperture fraction f, it makes sense to define a quality parameter Q according to $$Q = BT = \frac{\theta_{LED}(1-f)f}{[1-[\theta_{LED}R_{LED}+(1-\theta_{LED})R_{wall}](1-f)]^2} \quad (9)$$

In FIG. 11 the quality parameter Q is also plotted as a function of the aperture fraction f. From this plot it becomes apparent that Q goes through a maximum at an optimum aperture fraction $f_{opt}$. Values for $f_{opt}$ follow from $$f_{opt} = \frac{1-R_{av}}{2-R_{av}} \quad (10)$$

with $R_{av}$ given by Equation (2).

However, Q does not strongly depend on the aperture fraction f near f=$f_{opt}$. In case a high T is more important than a high B (for example when a general lighting application is concerned), one is advised to choose a value f>$f_{opt}$. The reverse is true when a high B is more important than a high T.

Figure 12:
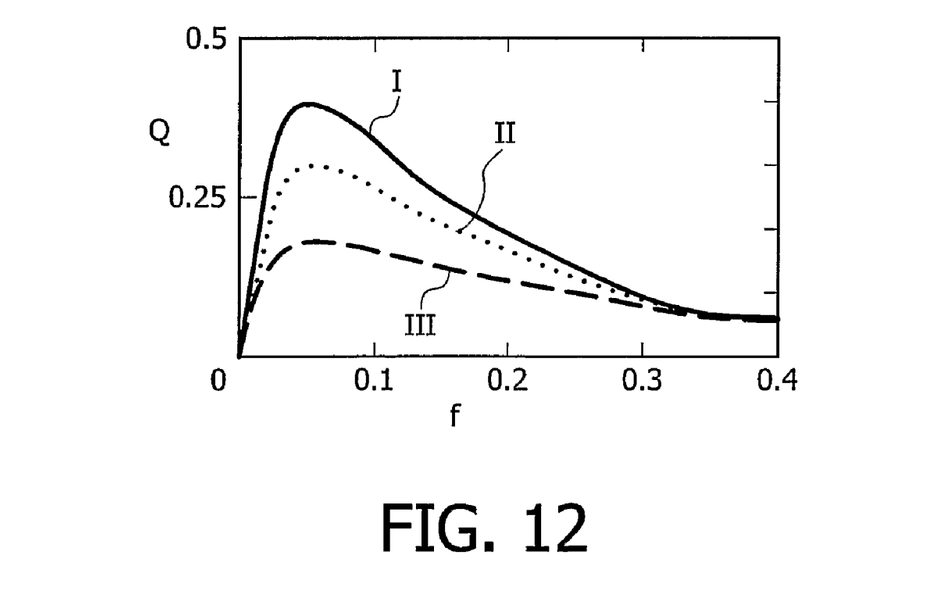
FIG. 12 is a diagram showing the dependence of the quality parameter Q on the aperture fraction f for various reflectivities of the inside reflecting wall surfaces and LED surfaces.

FIG. 12 shows calculations of the quality parameter Q factor as a function of the aperture fraction f for various values of $R_{LED}$ and $R_{wall}$ at a packing density $\theta_{LED}$=0.05 and for $\theta_c$=90°. (I: $R_{wall}$=0.98 and $R_{LED}$=0.7; II: $R_{wall}$=0.98 and $R_{LED}$=0.5; III: $R_{wall}$=0.96 and $R_{LED}$=0.5). For aperture fractions around $f_{opt}$, the quality parameter Q drops noticeably, i.e. the curve flattens out, if the reflectivities $R_{LED}$ and $R_{wall}$ decrease.

Figure 13:
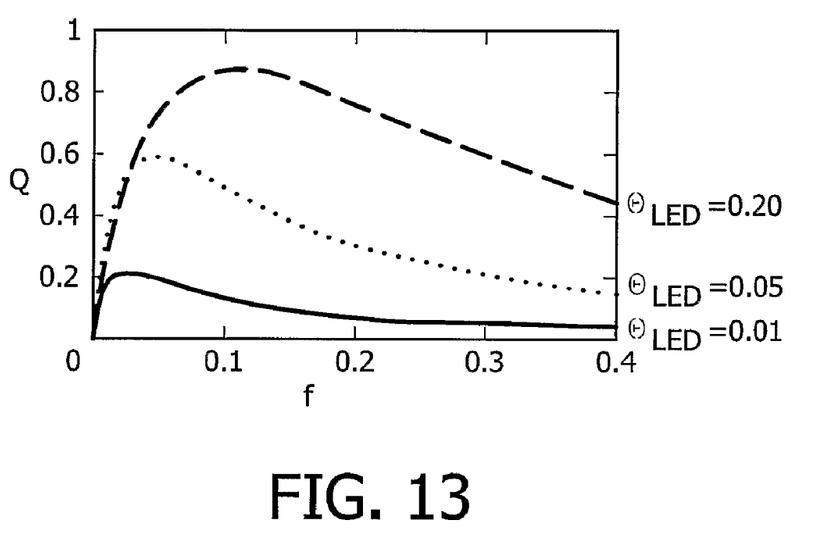
FIG. 13 is a diagram showing the dependence of the quality parameter Q on the aperture fraction f for several packing densities $\theta_{LED}$ of the LED elements on the inside walls of the light engine.

Furthermore, FIG. 13 shows calculations of the quality parameter Q as a function of the aperture fraction f for various values $\theta_{LED}$ at constant $R_{wall}$=0.98 and $R_{LED}$=0.5 and for $\theta_c$=90°. As can be seen, the quality parameter Q increases over the entire range of f with increasing packing density $\theta_{LED}$.

Figure 14:
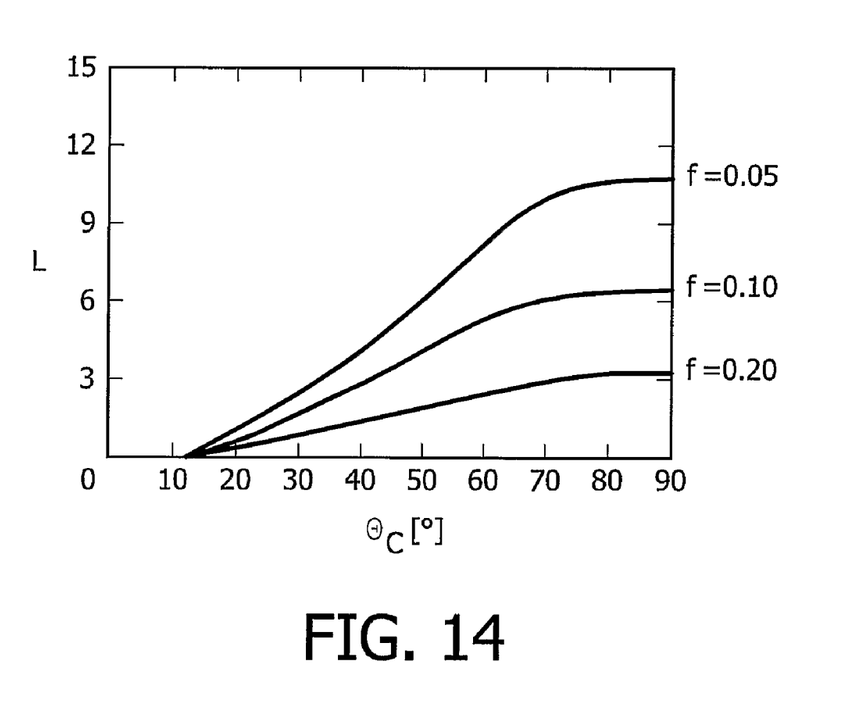
FIG. 14 is a diagram showing the dependence of the light concentration factor L on the collimation angle $\theta_C$ for various aperture fractions f.
Figure 15:
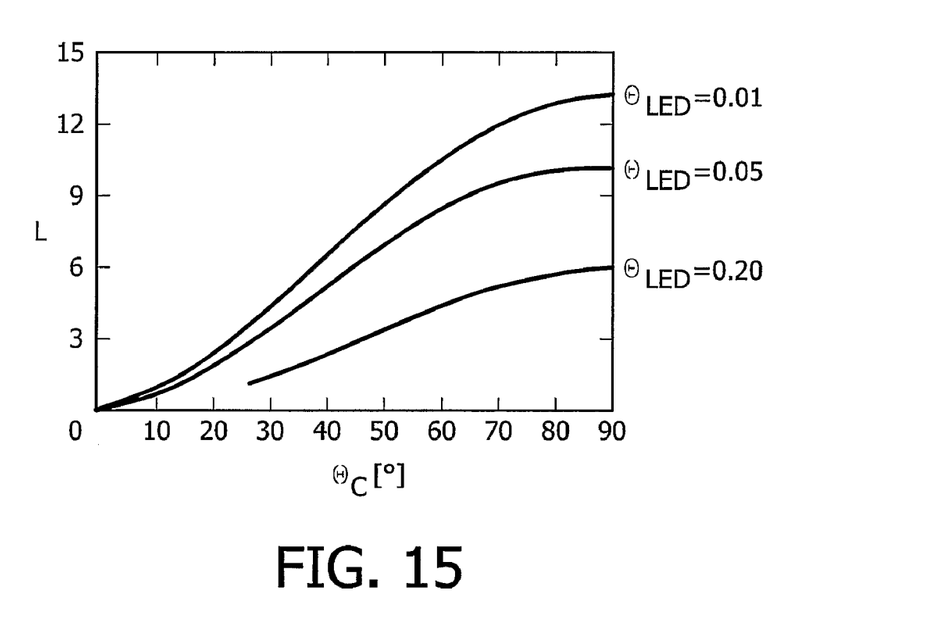
FIG. 15 is a diagram showing the dependence of a light concentration factor L on the collimation angle $\theta_C$ for various LED packing densities $\theta_{LED}$ for a particular first aperture fraction f.
Figure 16:
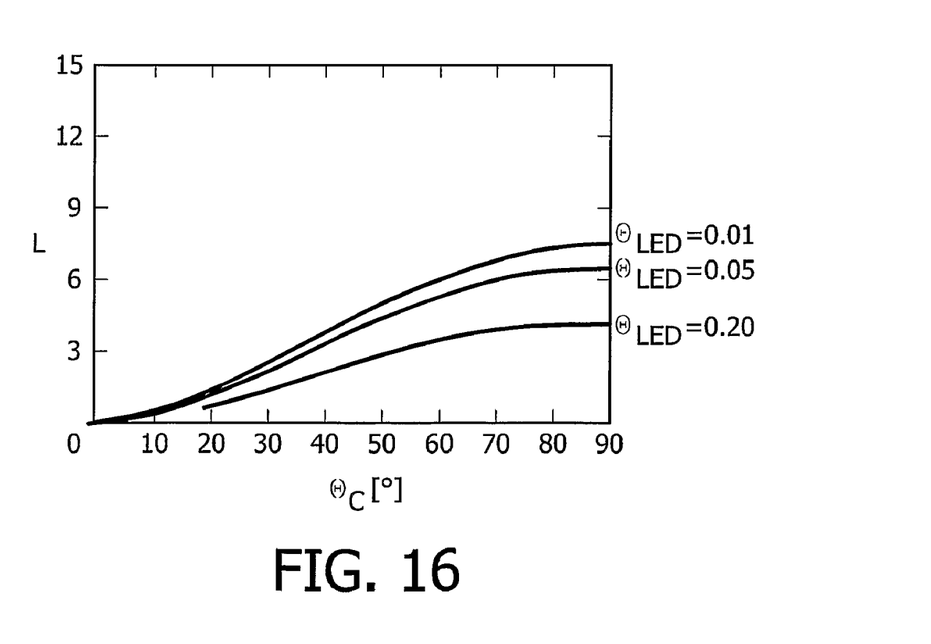
FIG. 16 is a diagram showing the dependence of a light concentration factor L on the collimation angle $\theta_C$ for various LED packing densities $\theta_{LED}$ for a particular second aperture fraction f.

FIGS. 14, 15 and 16 show calculations for the light concentration factor L($\theta_c$) at realistic reflectivities $R_{wall}$=0.98 and $R_{LED}$=0.5 for various values of the aperture fraction f (in FIG. 14 with a constant packing density $\theta_{LED}$=0.05) and for various values $\theta_{LED}$ (in FIG. 15 with a constant aperture fraction f=0.05 and in FIG. 16 with a constant aperture fraction f=0.1). In all figures the lines are drawn subject to the constraint according to Equation (7).

It is evident that, at least for $\theta_c$=60° (general lighting applications), use of a light engine according to the invention allows a significant brightness concentration to be accomplished with a numerical value up to a factor 5 at 80% lumen output (i.e. T=0.8). Also, higher light concentration factors L are achievable by reducing the aperture fraction f but at the cost of a reduced lumen efficiency.

Taking for granted that $R_{wall}$ and $R_{LED}$ are always chosen as high as practically possible, it is primarily the packing density $\theta_{LED}$ of the LED elements on the inner wall that affects the performance as a function of the aperture fraction f. A compromise will always have to be sought between brightness on the one hand and lumen efficiency on the other hand. Also the total required lumen output must be considered, whereby the size of the light engine is directly proportional to the total lumen output.

In case a high lumen efficiency is most important, it is advisable to choose the aperture fraction f≈0.10–0.12 at a low $\theta_{LED}$≈0.01. This allows for T≈0.8 and B≈0.07 which, at $\theta_c$=90°, is still seven times brighter than the screen-averaged brightness of the mounting wall. The brightness concentration factor L($\theta_c$) decreases at decreasing $\theta_c$ but remains substantial down $\theta_c$=40°.

In case a high brightness is most important, it is advisable to choose a higher LED packing density $\theta_{LED}$≈0.05, or even more if practicable. To raise the maximum attainable LED packing density, cooling of the LED elements should be provided, for example, by means of a matching refractive index cooling liquid as proposed above. At f≈0.1, one has a smaller T=0.65 but a higher brightness ratio B=0.3, which, at $\theta_c$=90°, is still six times brighter than the screen-averaged brightness B=$\theta_{LED}$ of the mounting wall. The brightness can be further increased by decreasing the aperture fraction f down to, for example, f=0.05. At f≈0.1, the quality parameter Q significantly improves at increasing $\theta_{LED}$. To obtain most benefit from the light engine according to the invention, it is therefore of great interest to increase $\theta_{LED}$ up to levels at and beyond $\theta_{LED}$=0.10

Although the present invention has been disclosed in the form of preferred embodiments and variations thereon, it will be understood that numerous additional modifications and variations could be made thereto without departing from the scope of the invention. For the sake of clarity, it is also to be understood that the use of "a" or "an" throughout this application does not exclude a plurality, and "comprising" does not exclude other steps or elements.

The invention claimed is:

1. A light engine comprising:
   a chamber having an interior region and at least one aperture, the chamber being formed by a wall having an inner surface facing the interior of the chamber;
   a plurality of LEDs positioned inside the chamber and mounted to the inner surface, each LED having a light-emitting surface facing the interior of the chamber;
   an outcoupling material optically connected to a light emitting surface of an associated LED;
   a reflective material distributed over the inner surface except where the inner surface is occupied by any mounted LEDs;
   a transparent covering material formed over the outcoupling material, mounted LEDs, and reflective material, wherein the transparent covering material encloses the outcoupling material, mounted LEDs, and reflective material between the transparent covering material and the inner surface, wherein the outcoupling material extends from the light-emitting surface to the transparent covering material, and wherein the reflective material is distributed in the region between the transparent covering material and the inner surface except for regions occupied by the mounted LEDs and the outcoupling material.

2. A light engine according to claim 1, wherein the outcoupling material forms a portion of the transparent covering material.

3. A light engine according to claim 2, wherein the cross section of the outcoupling material is wider at an interface between the outcoupling material and the transparent covering material than at an interface between the outcoupling material and the associated LED element.

4. A light engine according to claim 1, wherein the outcoupling material is a transparent dome that is optically connected to a light emitting surface of an associated LED element.

5. A light engine according to claim 4, wherein the dome protrudes through a hole in the transparent covering material.

6. A light engine according to claim 1, wherein the reflective material is a light converting substance.

7. A light engine according to claim 1, wherein LED elements of different wavelength characteristics are positioned inside the chamber.

8. A light engine according to claim 1, further comprising a light collimating element positioned at the aperture of the chamber.

9. A light engine according to claim 1, wherein the chamber is filled with a material which has a refractive index that approaches or matches the refractive index of the transparent covering material or the LED elements.

10. A light engine according to claim 9, wherein the material is a liquid material for front-end cooling of the LED elements.

11. A light engine according to claim 1, wherein an aperture fraction defined by the ratio of a surface area of the aperture to a total interior surface area of the light engine, the total interior surface area including the surface area of the aperture is $\leq 0.15$.

12. An automotive light system enclosing a light engine according to claim 1.

13. A light engine according to claim 8, wherein the chamber is filled with a material which has a refractive index that approaches or matches the refractive index of the collimating element.

14. A light engine according to claim 11, wherein the aperture fraction is $\leq 0.1$.

15. A light engine according to claim 1, where the reflective material is a reflective dry powder.

16. A light engine according to claim 1, wherein the chamber is filled with a material which has a refractive index that approaches or matches the refractive index of the outcoupling material.

* * * * *